United States Patent [19]

Booden

[11] 4,384,181

[45] May 17, 1983

[54] ELECTRICAL SWITCH ASSEMBLY

[75] Inventor: Wayne R. Booden, Southfield, Mich.

[73] Assignee: Microdot Inc., Darien, Conn.

[21] Appl. No.: 277,124

[22] Filed: Jun. 25, 1981

[51] Int. Cl.³ .......................... H01H 3/16; H01H 9/00
[52] U.S. Cl. ................................ 200/61.76; 200/159 R
[58] Field of Search ..... 200/16 A, 16 B, 61.76–61.81, 200/159 R, 159 A, 294, 296

[56] References Cited

U.S. PATENT DOCUMENTS

| | | | |
|---|---|---|---|
| 2,065,904 | 12/1936 | Meuer | 200/61.76 X |
| 2,605,374 | 7/1952 | Batcheller | 200/61.76 X |
| 2,605,375 | 7/1952 | Ellithorpe | 200/159 R |
| 2,626,336 | 1/1953 | Chute | 200/61.76 X |
| 2,712,047 | 6/1955 | Herterick | 200/159 R |
| 2,727,955 | 12/1955 | Brown | 200/159 R X |
| 2,899,511 | 8/1959 | Fraser | 200/61.81 |
| 2,927,988 | 3/1960 | Powell | 200/159 |
| 3,172,981 | 3/1965 | Loesch | 200/61.76 X |
| 3,211,872 | 10/1965 | Baer | 200/159 |
| 3,300,755 | 1/1967 | Dunn | 200/61.81 X |

Primary Examiner—J. R. Scott
Attorney, Agent, or Firm—Lyman R. Lyon

[57] ABSTRACT

A small electrical switch assembly for low voltage applications which has an insulating housing and cover, an insulating spring-biased plunger of relatively long travel, two terminals and a grounding terminal, and internal self-wiping contacts; and which is adapted for quick installation and fastening to a grounded structure via an electrically conductive fastening means that automatically grounds the switch assembly if grounding is required; and which is adapted for fully automatic assembly.

5 Claims, 11 Drawing Figures

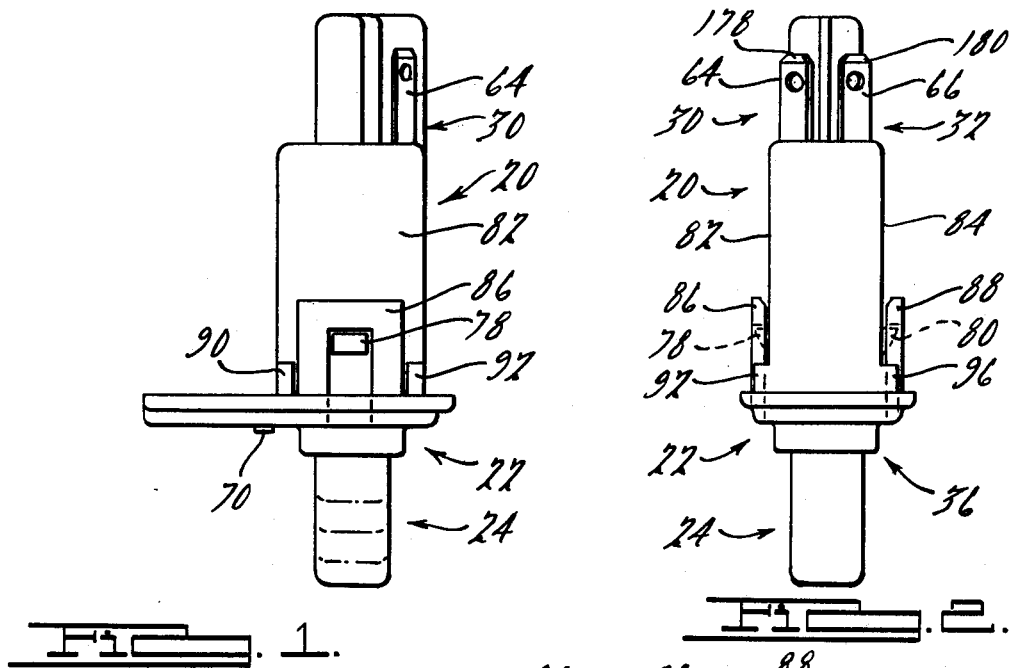
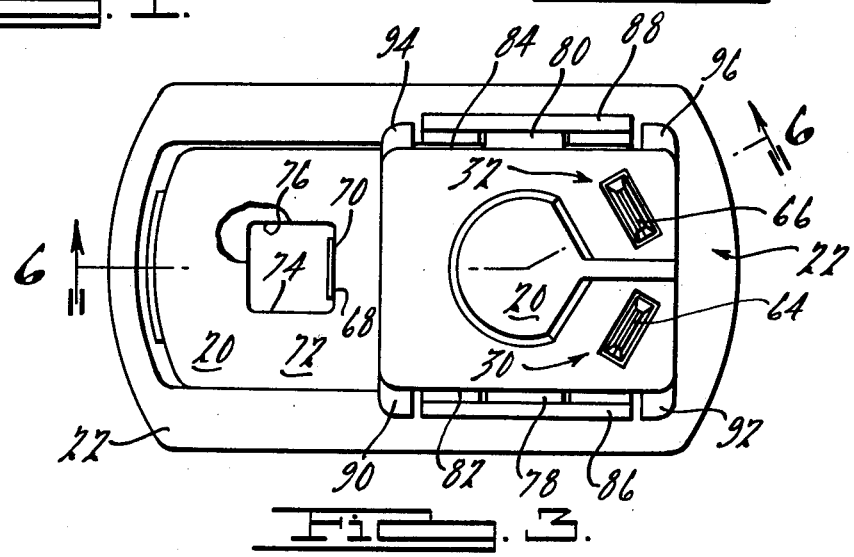
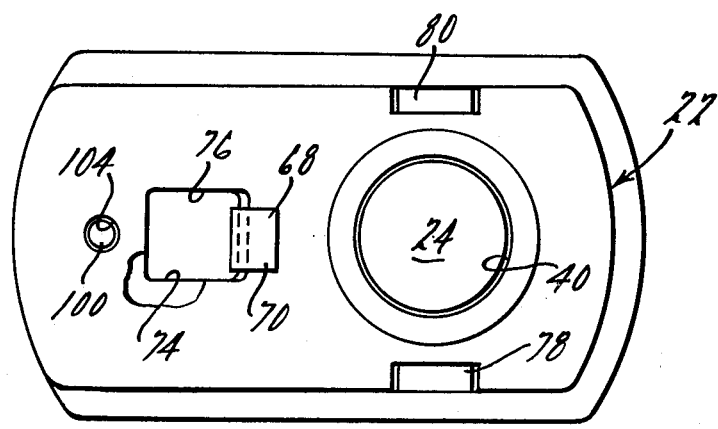

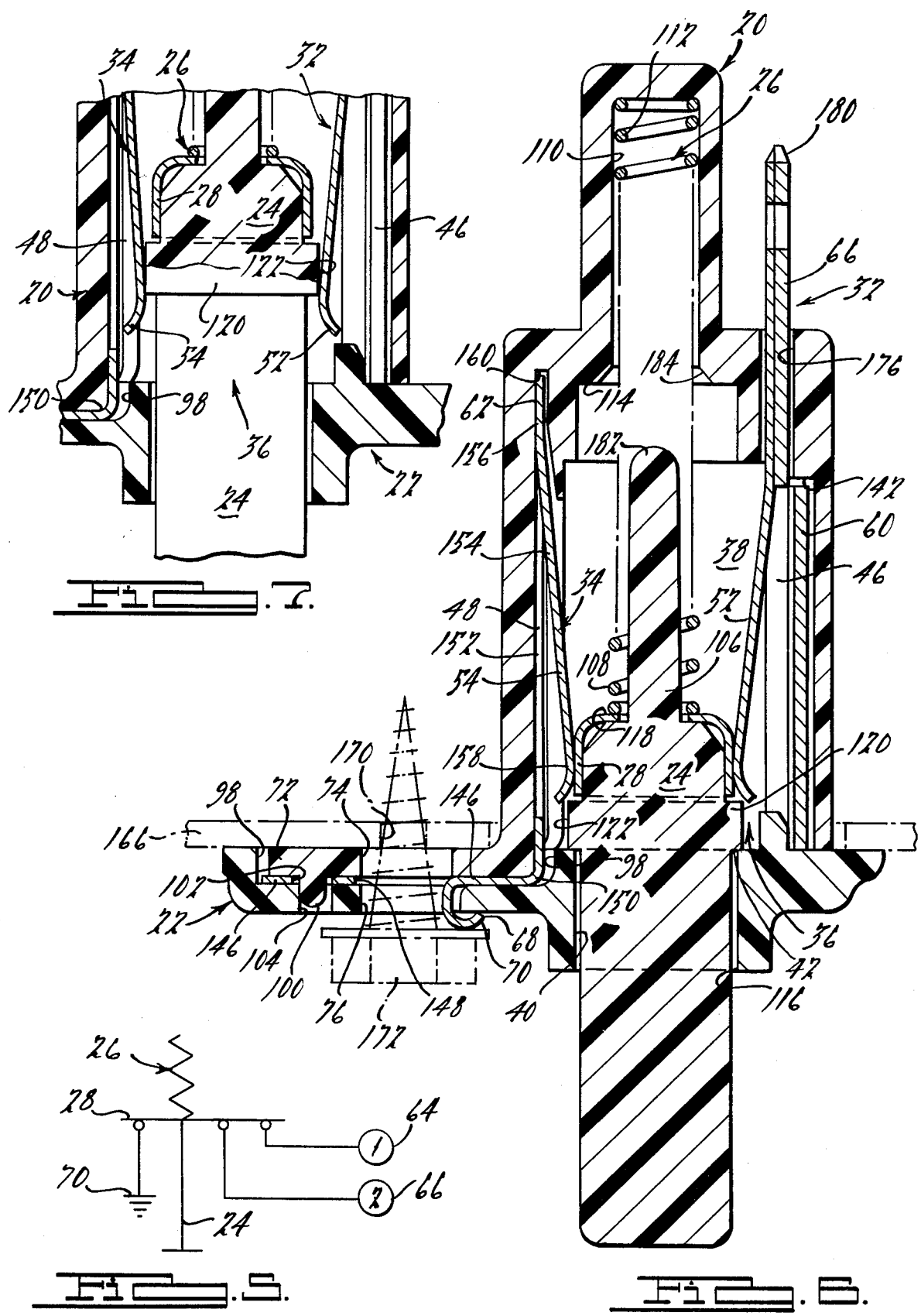

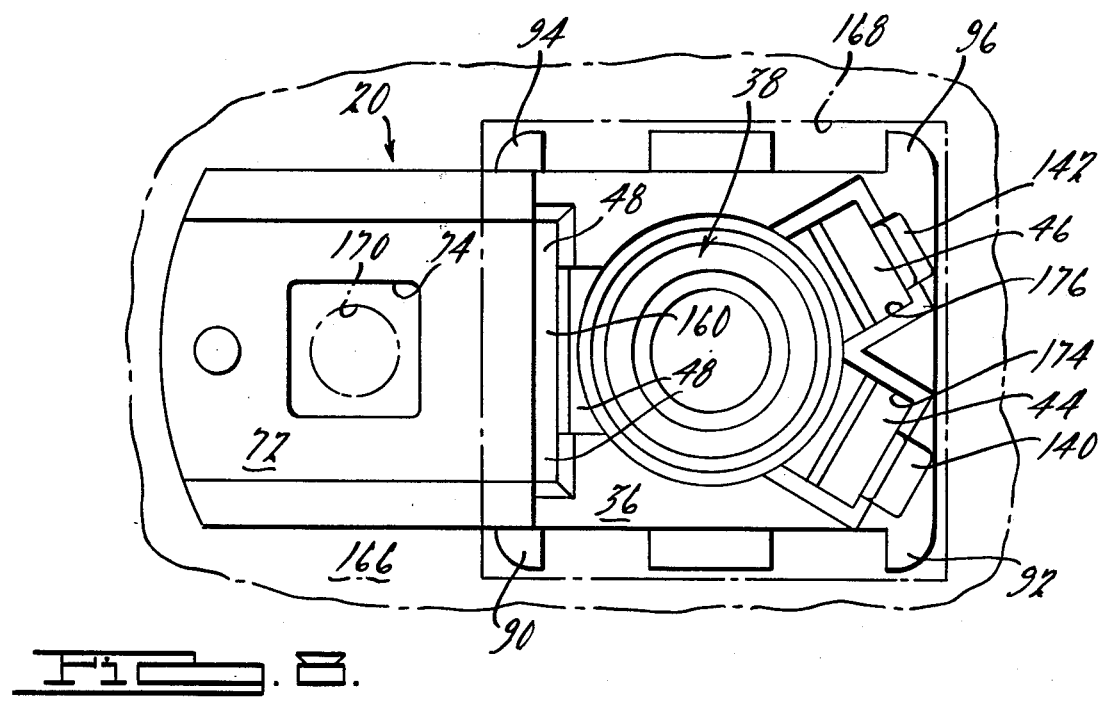
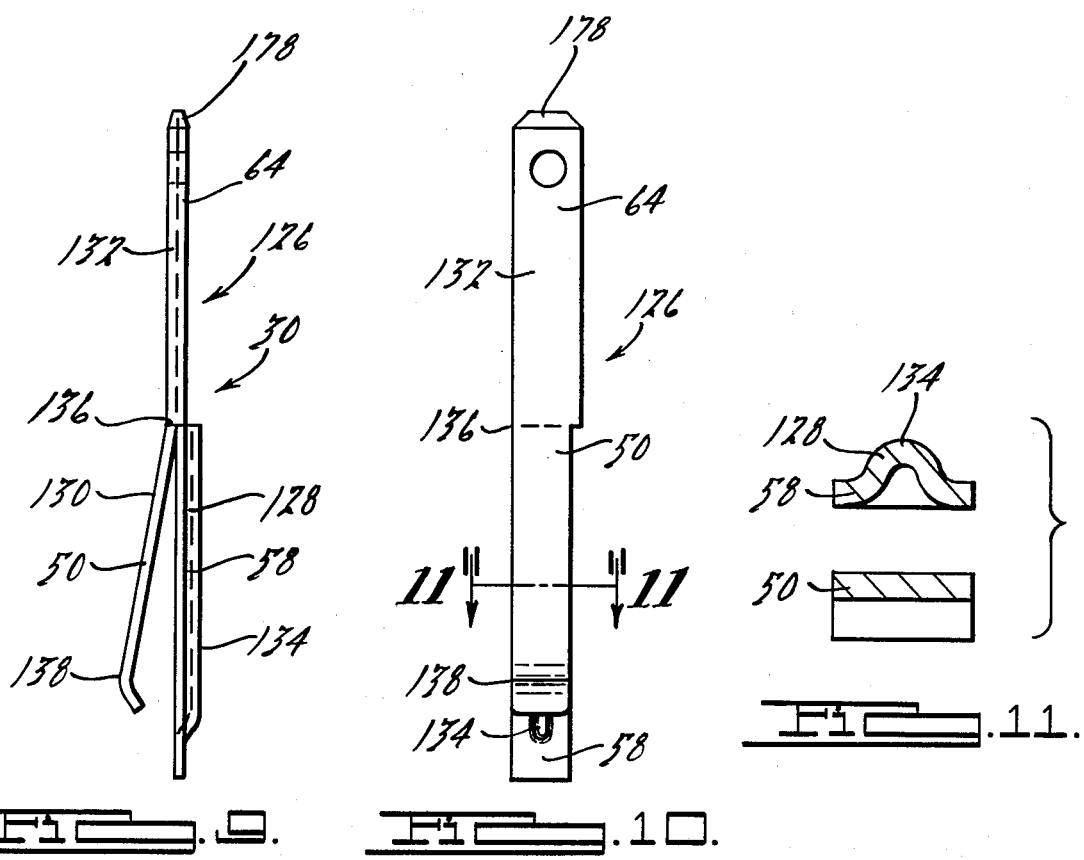

4,384,181

ELECTRICAL SWITCH ASSEMBLY

BACKGROUND AND SUMMARY OF THE INVENTION

This invention relates to the field of electrical switches, and more particularly to small electrical plunger switch assemblies used in low voltage applications where the switch is easily and quickly installed into some larger structure. A need has arisen for an improved easily manufactured electrical switch assembly having a relatively long plunger travel usable without modification in several applications on the same automobile. Such an electrical switch assembly should be adapted for quick fastening to a grounded structure in the automobile via a fastening means that electrically grounds the switch assembly to the grounded structure if grounding is required. The switch assembly should be corrosion resistant and relatively immune to the deleterious effects of occasional dripping water. A gasket should not be required between the switch and the structure into which it is installed. The contacts within the switch should have a wiping action for self-cleaning. The mating wiring harness connected to the switch should not move during operation of the switch. The switch should be compact and light weight.

Accordingly, one object of the instant invention is an improved electrical switch assembly.

Another object is a small electrical switch assembly having a plunger with relatively long travel in relation to the physical size of the switch.

Still another object is an electrical switch assembly usable in relatively low voltage circuits.

Yet another object is an electrical switch assembly that is relatively corrosion resistant, that requires no gasket for installation, and that has self-wiping contacts for self-cleaning.

Another object is an electrical switch assembly adapted for receiving and being automatically electrically grounded by an electrically conductive fastening means as the switch is installed into a grounded structure.

Other objects, features and advantages of the present invention will become apparent from the subsequent description and the appended claims taken in conjunction with the accompanying drawings.

BRIEF DESCRIPTION OF THE DRAWINGS

FIG. 1 is a side elevational view of the electrical switch assembly embodying the principles of the present invention;

FIG. 2 is an end elevational view of said switch assembly;

FIG. 3 is a top plan view of said switch assembly;

FIG. 4 is a bottom plan view of said switch assembly;

FIG. 5 is an electrical diagram of said switch assembly;

FIG. 6 is a fragmentary side elevational view of said switch assembly taken along line 6—6 of FIG. 3 showing the internal configuration of said switch with the plunger in its outermost position;

FIG. 7 is a fragmentary view similar to FIG. 6 illustrating the isolation of the conductive members from the conductive sleeve positioned on the plunger when the plunger is depressed;

FIG. 8 is a bottom plan view of the housing;

FIG. 9 is a side elevational view of a primary conductive member;

FIG. 10 is a front elevational view of a primary conductive member; and

FIG. 11 is a fragmentary end view of a primary conductive member taken along line 11—11 of FIG. 10.

DESCRIPTION OF THE PREFERRED EMBODIMENT

The preferred embodiment of present invention shown in the drawings and described below forms a normally closed spring-biased plunger switch, which is diagrammatically shown in FIG. 5. The preferred embodiment has three electrical termination points: terminals 1 and 2, so labelled in FIG. 5, which are the primary current-conducting terminals, and a grounding terminal, symbolically labelled as such in FIG. 5, which grounds out terminals 1 and 2 when the plunger is released, that is, not actuated.

The preferred embodiment is comprised of eight components: an insulating housing 20, an insulating cover 22, an insulating plunger 24, a helical compression spring 26, an electrically conductive sleeve 28, and three electrically conductive members 30, 32 and 34. Two of the three conductive members 30 and 32, called primary conductive members or primary members, are identical in shape and construction. They correspond to terminals 1 and 2 on FIG. 5. The third conductive member 34, called the grounding conductive member or grounding member, differs in shape and construction from the other two, and corresponds to the grounding terminal in FIG. 5.

These eight components are positioned with respect to one another as follows. As shown in FIGS. 1, 2 and 3, the cover 22 is disposed on one end 36 of the housing 20 and overlies access to a chamber 38 within the housing 20, as shown in FIG. 6.

The plunger 24, which can best be seen in FIG. 6, is movably disposed within the chamber 38 between two extreme longitudinal positions and extends outwardly through a passage 40 in the cover 22. The plunger is longitudinally captivated by the housing 20 on one end, which limits the plunger's inward travel, and the cover 22 on the other end which limits the plunger's outward travel. A shoulder 42 on the plunger 24 cooperates with the cover 22 to limit outward movement of the plunger.

The spring 26 as shown in FIG. 6, is disposed in the chamber 38 of the housing. It extends between the housing and plunger, and biases the plunger 24 outwardly.

As shown in FIGS. 6 and 7, the conductive sleeve 28 is disposed in the chamber 38 of the housing, and is positioned on and travels with the plunger 24.

The three conductive members 30, 32 and 34 are substantially disposed in the housing 20. The housing 20 has three elongated slots 44, 46 and 48 opening from the same end of the housing as the chamber 38, as shown in FIG. 8. These slots longitudinally extend into the housing and also open into the chamber. The conductive members 30, 32 and 34 are partially disposed in slots 44, 46 and 48 respectively, one per slot. As shown in FIGS. 2, 3 and 6, the two primary conductive members 30 and 32 extend through the housing 20 opposite the cover 22. As shown in FIG. 6, the grounding conductive member 34 is partially disposed in slot 48 on a side of the housing substantially opposite slots 44 and 46.

Although the conductive members 30, 32 and 34 are not all shaped alike, they share common characteristics, as shown in FIG. 6. Each conductive member has a first portion, 50, 52, and 54 respectively, defining a springable tine extending into the chamber 38. Each has a second portion, 58, 60 and 62 respectively, inserted into a slot in the housing 20 which is fixedly retained therein by the cover 22 which abuts one end of the slots. Each has a third portion 64, 66 and 68 respectively, that extends outwardly from the housing 20 to facilitate electrical connection. The third portions 64 and 66 of the primary conductive members 30 and 32 extend outwardly from the end of the housing opposite the cover as shown in FIGS. 2, 3 and 6, and constitute terminals 1 and 2 in FIG. 5. The third portion 68 of the grounding conductive member 34 extends outwardly from the housing by virtue of a tab 70 adjacent to and protruding from a hole 76 in the cover 22, as shown in FIG. 6, and constitutes the grounding terminal in FIG. 5.

When the plunger 24 is in its extreme outward position, the sleeve 28 is in electrical contact with the first portion of each conductive member, which, of course, electrically connects all the conductive members together. FIG. 6 shows this electrical contact occurring.

When the plunger 24 is in its extreme inward position, the sleeve 28 is electrically isolated from the conductive members, thereby interrupting electrical continuity between the conductive members of the preferred embodiment. As shown in FIG. 7, electrical contact between the sleeve 28 and conductive members 30, 32 and 34 in the preferred embodiment is interrupted after the plunger and sleeve have travelled through a relatively small part of the plunger's total possible inward travel.

Armed with the above general description, the more detailed features of the preferred embodiment described below may now be appreciated.

As shown in FIGS. 3 and 6, the housing 20 has a bracket 72 extending laterally from the end 36 of the housing that provides access to the chamber 38. This bracket 72 is positioned adjacent to slot 48 in the housing. The bracket 72 is provided with a rectangular hole 74.

The cover 22 overlying the housing 20, as shown in FIGS. 3, 4 and 5, has a hole 76 which communicates with the hole in the bracket.

The cover and the housing are interlocked together by features of each which assure proper alignment during and after assembly of the cover to the housing. First, the housing 20 is provided with wedge-shaped nibs 78 and 80 protruding externally from opposite side walls 82 and 84 respectively of the housing, as shown in FIGS. 1 and 2. When the cover is disposed on the housing these nibs are lockingly engaged by clips 86 and 88 extending from the cover 22 adjacent to and parallel to the side walls 82 and 84 of the housing. Second, as shown in FIGS. 3 and 8, the four corners of the end of the housing project laterally from the side walls to form guides 90, 92, 94 and 96 which channel the clips 86 and 88 between the guides, thereby insuring proper alignment of the cover 22 during and after its installation on the housing 20. Third, as is evident when FIGS. 1, 2, 3, and 6 are collectively studied, the cover 22 has a shallow hollow 98 that is complementary to the bracket 72 of the housing 20 shown in FIG. 6. Thus, when the cover is installed on the housing, the cover surrounds the sides of the bracket 72, limiting lateral movement of the cover with respect to the housing. Fourth, as shown in FIGS. 4 and 6, the bracket 72 of the housing 20 has a post 100 which projects through a complementary orifice 102 in the grounding conductive member 34 and into a complementary orifice 104 in the cover 22. This feature limits lateral movement of the cover and the grounding member with respect to the housing.

As shown in FIG. 6, the housing and plunger have features that give lateral stability to the spring, especially as it is longitudinally flexed. First, a portion of the plunger 24 in contact with a first end portion 108 of the spring 26 defines a finger 106 that fits within and guides the first end portion 108 of the spring as the spring is flexed. Second, the chamber 38 of the housing 20 has an innermost region 110 which partially envelopes and guides a second end portion 112 of the spring 26 during flexion of the spring.

During substantial inward travel of the plunger 24, the finger 106 of the plunger and the compressing spring 26 enter the innermost region 110 of the chamber 38, thus permitting greater inward travel. An internal surface near the innermost region 110 of the housing provides a positive stop 114 that harmlessly limits extreme inward travel of the plunger. Since the chamber 38 in the housing and passage 40 in the cover together are long enough to accept the entire length of the plunger 24, this positive stop 114 is not encountered until the plunger has been pushed inward past the outer lip 116 of the passage 40 in the cover. Thus, under normal operating conditions of the preferred embodiment, the positive stop does not limit plunger travel since the plunger would not be pushed inward that far.

As shown in FIG. 6, the spring 26 helps retain the sleeve 28 on the plunger 24 since the first end portion 108 of the spring is always pressed against the cup-shaped sleeve. The sleeve 28 provides a seat 118 for the spring, thereby protecting against the wear of the plunger by the spring which could occur absent such a spring seat.

The segment 120 of the plunger defining the shoulder performs another function besides limiting outward travel of the plunger 24. As shown in FIG. 7, this segment 120 of the plunger 24 provides a cylindrical surface 122 which rapidly cams the tines 50, 52 and 54 of the conductive members 30, 32, and 34 away from the sleeve 28 as the plunger 24 moves inward, thereby furnishing a relatively quick break of electrical contact between the tines and sleeve. The tines intentionally extend relatively close to the surface 122 so that the electrical continuity between the sleeve and tines will be broken near the beginning of the plunger's long inward travel from its outermost position.

In the preferred embodiment, the housing, cover, and plunger are each made of one piece injection molded hard tough plastic, such as nylon, while the sleeve and the three conductive members are each made of a tin-plated brass stamping which is punched, folded, and bent as required.

The primary conductive members are each formed from a one-piece flat stock stamping 126 having two longitudinal forks 128 and 130 and a supporting base 132. As shown in FIGS. 9, 10 and 11, one fork 128 is longitudinally creased along its entire length, giving the fork a ridge 134 which protrudes from the plane of the supporting base 132. This fork 128 corresponds to the second portions 58 and 60 of the primary conductive members 30 and 32, as shown in FIG. 6. Returning to FIGS. 9, 10, and 11, the other fork 130 has a transverse bend 136 where the fork 130 meets the supporting base 132, and also has a transverse bend 138 near the opposite end of the fork. This fork 130 corresponds to the first portions 50 and 52 of the primary conductive members 30 and 32, which define springable tines. The location of the two bends can also be seen in FIG. 6. The folded supporting base corresponds to the third portions 64 and 66 of the primary conductive members 30 and 32 which extend outwardly from the housing opposite the cover as shown in FIGS. 1, 2, and 6. The third portions 64 and 66 are the terminal ends of the primary conductive members 30 and 32 diagrammatically illustrated in FIG. 5 as terminal 1 and terminal 2.

The ridges in the second portions 58 and 60 of the conductive members 30 and 32 add to the overall rigidity of the primary conductive members. Additionally the ridges contact lateral surfaces 140 and 142 near the inward end of elongated slots 44 and 46 which the second portions of the conductive members are disposed in, thereby limiting inward insertion of the primary members into their slots.

The grounding conductive member 34, shown in FIG. 6, is also formed from a one-piece flat stock stamping which initially has an elongated rectangular shape. The stamping has a front area 146, which is punched with the aforementioned orifice 102 and a rectangular hole 148. The hole 148 communicates with the holes 74 and 76 in the bracket 72 and the cover 22. A peninsular piece of material from the hole 148 forms the aforementioned tab 70, which is bent outwardly from the hole 148. The front area 146 of the grounding member defines a bracket which is complementary to and disposed over the bracket of the housing as shown in FIG. 6. A transverse bend 150 separates the front area 146 of the grounding member 34 from a rear area 152 of the grounding member 34. The rear area 152 is punched to form an elongated peninsula 154 longitudinally and centrally located in the rear area. This peninsula of material has a transverse bend 156 where the peninsula remains connected to the rear area 152, and has a transverse bend 158 near the opposite end of the peninsula. This peninsula 154 forms the first portion 54 of the grounding conductive member 34 and defines a springable tine. The remaining part of the rear area of the grounding member forms the second portion 62 of the grounding member 34, which is captivated in the slot 48. Insertion of the grounding member 34 into the slot 48 is limited by contact with either the blind end 160 of the slot 48 or the bracket 72 of the housing 20 or both. As shown in FIG. 6, the tab 70 of the grounding member 34 is bent outwardly through the hole 76 in the cover and then laterally towards the plunger 24, thereby projecting over a part of the cover. The tab 70 forms a protuberance adapted for making positive and automatic electrical contact with an electrically conductive fastening means, for attaching the electrical switch assembly to a grounded structure, to be received by the adjacent communicating holes.

FIGS. 6 and 8 show the housing 20 set in a rectangular hole 168 in sheet metal 166. The sheet metal 166 is also provided with a hole 170 designed to receive an electrical fastening means for fastening the switch to the sheet metal. The preferred embodiment is designed to be installed in a grounded structure, like the sheet metal in FIG. 8, having a first that is complementary to the generally rectangular external cross-section of the housing defined by the guides of the housing, and having a second hole complementary to the hole in the bracket and designed to receive an electrically conductive fastening means.

One possible electrically conductive fastening means is the hex-head sheet metal screw 172, shown in FIG. 6, which is in positive electrical contact with the tab 70 and the sheet metal 166 opposite the tab. Another example of an electrically conductive fastening means is a pop-rivet. A third is a threaded bolt. The sheet metal is one possible example of a grounded electrical structure to which the preferred embodiment could be attached. Those skilled in the art are familiar with other possible electrically conductive fastening means and other possible grounded structures, so additional examples of the same need not be enumerated here.

Once the preferred embodiment is installed in and fastened to a grounded structure, the housing, cover and third portions of the conductive members will be stationary with respect to said grounded structure. Hence, any wiring harness connected thereto would not move when the switch is operated via the plunger.

The components of the preferred embodiment cooperate to help prevent the plunger from binding as it is actuated by forces having a substantial lateral component in addition to a longitudinal force component. First, there is little friction between the cover 22 and the plunger 24 as the plunger travels in the passage 40 of the cover, since both the bore defined by the passage and the sides of the plunger in contact therewith are smooth hard plastic. Second, as shown in FIG. 6, the generally close tolerance between passage 40 and plunger 24 combined with length of the passage help keep the plunger from cocking and binding in the passage. Third, the spring 26 imparts lateral stability to the plunger 24, helping to guide the plunger and keeping it from cocking, since the spring itself is laterally stabilized by the innermost region 110 of the housing 20.

Numerous features of the components of the preferred embodiment and the manner in which the components cooperate, render the preferred embodiment particularly well adapted for fully automatic assembly. Many of these features are readily apparent to those skilled in the art. Some of the more important of these features which render the preferred embodiment particularly well adapted for fully automatic assembly are described below.

The previously described features of the cover and the housing which interlock the cover and housing together and assure proper alignment of the same during and after assembly, help adapt the preferred embodiment for fully automatic assembly.

The regions 174 and 176 of the elongated slots passing through the housing 20 opposite the cover 22 are snugly complementary to the third portions 64 and 66 of the primary conductive members 30 and 32 disposed therein. This snug fit insures that the primary conductive members remain stationary after being fully inserted into the elongated slots during automatic assembly.

The ends 178 and 180 of the primary members 30 and 32 opposite the cover 22 are slightly rounded or tapered which aids in insertion of the same into regions 174 and 176 of the slots 30 and 32 during automatic assembly.

The end 182 of the finger 106 on the plunger 24 is slightly rounded which aids in placing the spring 26 over the finger 106 during automatic assembly.

The region 184 of the chamber 38 adjacent to the innermost region 110 is shaped to funnel the second end portion 112 of the spring 26 into the innermost region 110 of the chamber 38 during automatic assembly.

The springable tines of the conductive members 30, 32 and 34 are bent from the longitudinal axis of their respective conductive members at a relatively shallow angle. Thus, when the plunger 24 is inserted into chamber 38 of the housing 20 after the conductive members 30, 32 and 34 are already in place, the conductive sleeve 28 on the plunger is able to cam the tines aside, thereby facilitating automatic assembly.

The preferred embodiment has relatively few components, and these components are of relatively simple shape and construction, thus helping to adapt the same for automatic assembly.

In light of the foregoing features, it is deemed clear to one skilled in the art that the electrical switch assembly described herein is adapted for fully automatic assembly.

The materials used in the components of the preferred embodiment have already been enumerated. Those skilled in the art no doubt recognize, though, that the components of the instant invention can be of any conventional or suitable materials made by using any conventional or suitable manufacturing techniques. Such materials and manufacturing techniques are well known in the field of small electrical switch design and manufacture and thus need not be recited here.

While it is apparent that the preferred embodiment of the invention disclosed is well calculated to fulfill the objects above stated, it will be appreciated the invention is susceptible to modification, variation and change without departing from the proper scope or fair meaning of the subjoined claims.

What is claimed is:

1. An improved electrical switch assembly of the type having a housing, a cover, and a spring-biased plunger, wherein the improvement comprises:
   an elongated insulating housing having
      a chamber opening from one end of the housing, providing an access to the chamber, and
      a plurality of slots, opening from said end of the housing, longitudinally extending into the housing and opening into the chamber;
   an insulating cover, overlying the access to the chamber, having
      a passage communicating with the chamber;
   an insulating plunger movably disposed within the chamber between two extreme longitudinal positions of the plunger, extending outwardly through the passage in the cover, having a shoulder cooperating with the cover to limit outward movement of the plunger;
   a spring disposed in the chamber of the housing, extending between the housing and plunger, biasing the plunger outwardly;
   a conductive sleeve disposed in the chamber of the housing, positioned on and traveling with the plunger; and
   a plurality of conductive members substantially disposed in the housing having
      a first portion defining a springable tine extending into the chamber,
      a second portion inserted into a slot in the housing, fixedly retained therein by the cover abutting one end of the slot, and
      a third portion extending outwardly from the housing to facilitate electrical connection,
   the sleeve being a bridging electrical contact with the first portion of each conductive member when the plunger is in one of the two positions, and
   the sleeve being electrically isolated from the conductive members when in the other of the two positions.

2. An improved electrical switch assembly, adapted for installation in a grounded structure via an electrically conductive fastening means, of the type having a housing, a cover, and a spring-biased switch, wherein the improvement comprises:
   an elongated insulating housing having
      a chamber opening from one end of the housing, providing an access to the chamber,
      a trio of elongated slots, opening from said end of the housing, longitudinally extending into the housing and opening into the chamber, and
      a bracket, extending laterally from the one end of the housing having the access to the chamber, positioned adjacent to one of the slots, and provided with a hole;
   an insulating cover overlying the bracket and the chamber, having
      a passage communicating with the chamber, and
      a hole communicating with the hole in the bracket;
   an insulating plunger movably disposed within the chamber between two extreme longitudinal positions of the plunger, extending outwardly through the passage in the cover, having a shoulder cooperating with the cover to limit outward movement of the plunger;
   a spring disposed in the chamber of the housing, extending between the housing and plunger, biasing the plunger outwardly;
   a conductive sleeve disposed in the chamber of the housing, positioned on and traveling with the plunger; and
   a trio of conductive members substantially disposed in the housing having
      a first portion defining a springable tine extending into the chamber,
      a second portion inserted into a slot in the housing, fixedly retained by the cover abutting one end of the slot, and
      a third portion extending outwardly from the housing to facilitate electrical connection,
      wherein one of the conductive members forms a grounding member having
         a second portion inserted into the slot adjacent to the bracket, and
         a third portion extending outwardly from the housing substantially parallel to the bracket, disposed under the cover, and provided with
         a hole communicating with the hole in the bracket, and
         a tab adjacent to the hole in the grounding conductor, adapted for making electrical contact with an electrically conductive fastening means received within the holes in the bracket, grounding member, and cover,
   the sleeve being in bridging electrical contact with the first portion of each conductive member when the plunger is in one of two positions, and
   the sleeve being electrically isolated from the conductive members when in the other of the two positions.

3. An electrical switch assembly as recited in claim 2 wherein: the tab on the third portion of the grounding member extends through the hole in the cover and partially over the cover, forming a protuberance adapted to provide automatic positive electrical contact between the grounding member and the electrically conductive fastening means installed in the holes in the bracket of the housing, grounding member, and cover.

4. An electrical assembly as recited in claim 2 wherein:

the spring is a helical compression spring having a first end portion in contact with the plunger and a second end portion in contact with the housing;

the chamber of the housing has an innermost region that partially envelopes and guides the second end portion of the spring as the spring is longitudinally flexed; and the portion of the plunger adjacent to the first end portion of the spring defines a finger that fits within and guides the first end portion of the spring, such that the spring is laterally stable while being longitudinally flexed by movement of the plunger, and such that, as the spring is compressed by the plunger, the finger of the plunger may enter the innermost region of the chamber in the housing, thereby permitting further compression of the spring and further inward travel of the plunger.

5. An electrical switch assembly as recited in claim 2, wherein:

the housing, cover, and plunger are each of one piece injection molded plastic construction;

the conductive members are each of one-piece flat stock stamping construction bent and folded as required; and the sleeve is of one-piece construction.

* * * * *